United States Patent
Datcuk, Jr.

[11] Patent Number: 6,152,390
[45] Date of Patent: Nov. 28, 2000

[54] CARTRIDGE PRESET DRAG MECHANISM

[75] Inventor: Peter T. Datcuk, Jr., Sewell, N.J.

[73] Assignee: Penn Fishing Tackle Manufacturing Company, Philadelphia, Pa.

[21] Appl. No.: 09/401,206

[22] Filed: Sep. 22, 1999

[51] Int. Cl.⁷ .................................................. A01K 89/00
[52] U.S. Cl. ........................ 242/270; 242/268; 242/303; 242/304
[58] Field of Search .................. 242/270, 268, 242/291, 295, 303, 304

[56] References Cited

U.S. PATENT DOCUMENTS

| | | | |
|---|---|---|---|
| 3,425,644 | 2/1969 | Griste | 242/268 |
| 5,149,009 | 9/1992 | Sato | 242/268 |
| 5,265,824 | 11/1993 | Sato | 242/268 |
| 5,588,605 | 12/1996 | Yamaguchi | 242/268 |
| 5,615,842 | 4/1997 | Furubayashi | 242/268 |
| 5,690,288 | 11/1997 | Yamaguchi | 242/268 |
| 5,901,913 | 5/1999 | Yamaguchi et al. | 242/268 |
| 5,921,491 | 7/1999 | Kim | 242/268 |

*Primary Examiner*—Donald P. Walsh
*Assistant Examiner*—Emmanuel M. Marcelo
*Attorney, Agent, or Firm*—Frank J. Benasutti

[57] ABSTRACT

A preset cartridge system is disclosed wherein the drag knob moves Belleville washers within a separate cartridge located in the reel. The cartridge is acted upon by a drag lever. The springs in the cartridge preset system are compressed within the cartridge. These springs act on a bearing/spring cup retained in the cartridge or directly upon the bearing. This allows the preset screw to compress the springs, but not alter the free spool condition of the drag mechanism.

4 Claims, 5 Drawing Sheets

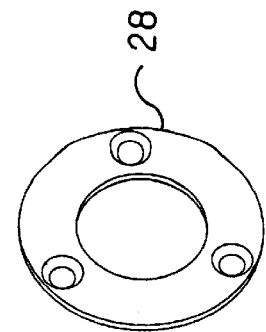
FIG. 3G
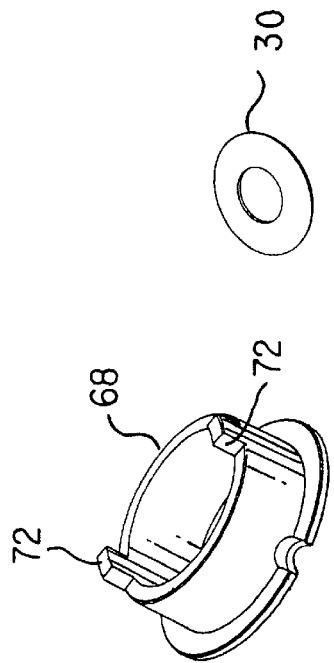
FIG. 3D
FIG. 3B
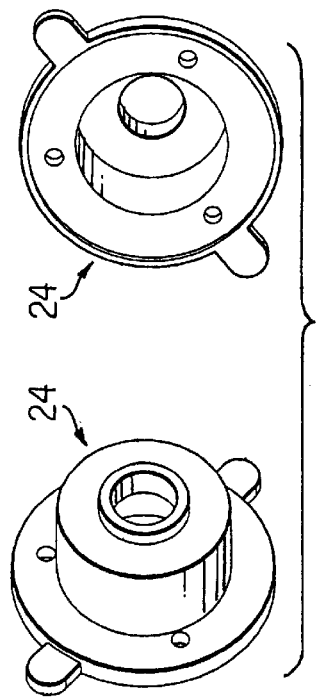
FIG. 3F
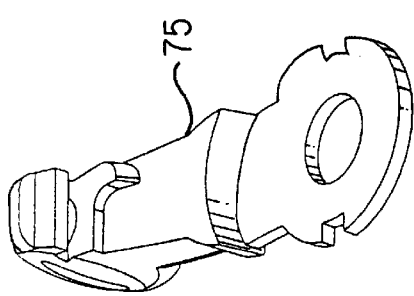
FIG. 3A
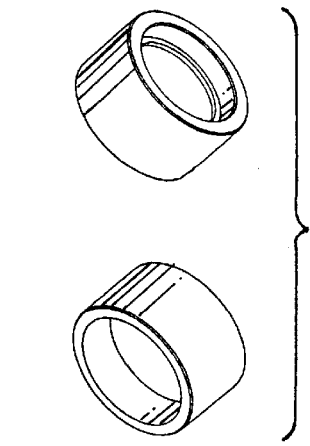
FIG. 3E

CARTRIDGE PRESET DRAG MECHANISM

BACKGROUND OF THE INVENTION

1. Field of the Invention

This invention relates to drag mechanisms for fishing reels and, in particular, to such mechanisms which can be preset as well as being variable and which will preserve the "free spool" condition when preset.

2. Description of the Prior Art

In the prior art such as that shown in the Griste Patent No. 3,425,644, it is known to have a preset adjustment knob, which can be rotated to preset the force in the drag mechanism in a reel. This is accomplished by means of turning the knob (92 FIG. 6 of Griste) which is keyed to a preset screw in a bearing positioning head 63. This is threaded in a bearing carrier 61. Rotation causes axial movement of the head 63 and bearing 60. Thus, when the preset knob is turned, it moves the bearing and spool shaft and spool; thereby removing the clearance between the drag plate and the drag washer in the reel's drag mechanism.

Also in such mechanisms, there is a brake control or drag lever 75 (FIG. 1 of Griste). When one rotates the lever 75, it rotates the cam 68. The pins 65, which are fixed to the bearing carrier 61, move along the surface 70 and force the bearing carrier 61 axially to the left.

For free spooling, the brake control lever 75 is positioned such that the cam follower pins 65 will be seated in the notches 69 in the cam. In this position, the drag washer 37 will be held apart from the drag washer 42 by the action of the springs 39 and 40. No braking action will be applied under this condition.

Presetting of the desired braking action can be effected by rotation of the preset knob 92 which determines the positioning of the bearing 60 within the carrier 61 independent of the shifting of bearing 60 by the operation of the brake control lever 75.

The free spool condition in such a prior art device can be lost when the preset screw is tightened enough that it removes the clearance between the drag members.

Thus, it is desirable to be able to preset the drag, without losing free spool condition.

SUMMARY OF THE INVENTION

In accordance with the preferred embodiment of my invention, I provide a preset mechanism comprising a plurality of springs within a cup or cartridge, and a means which allows for preloading the springs without taking up any of the space between the drag plate and drag washer. Thus, when the drag lever is thrown; so that the space between the drag plate and drag washer is closed, there is already a predetermined amount of force being applied depending on the position of the preset mechanism. This force may be adjusted by a positioning screw.

When the drag lever is backed off, the space opens up between the drag plate and drag washer into a free spool condition.

In accordance with my invention, I provide a fishing reel having a free spool condition and drag condition; and a spring loaded preset drag mechanism comprising: means to preset the force of the spring loading for the drag condition while maintaining the free spool condition.

In a specific embodiment I provide a shaft journaled in a bearing so as to move axially therewith; restraining means to restrain said bearing from axial movement, in a first condition; force application means to apply a force against said bearing while in the first condition and to cause it to move axially and move said shaft, in a second condition; variation means to vary the amount of force applied by the force application means, in said first condition without causing said bearing to move to said second condition. The bearing is restrained from axial movement within the retainer means. Said spring impinges upon the bearing means to impart axial force thereto within said restraining means; said spring being acted upon by a variation means, positioned, in part, therein.

BRIEF DESCRIPTION OF THE DRAWINGS

FIGS. 3A through 3G show the various parts of the mechanism in exploded perspective views;

DESCRIPTION OF THE PREFERRED EMBODIMENTS

Figure 1:
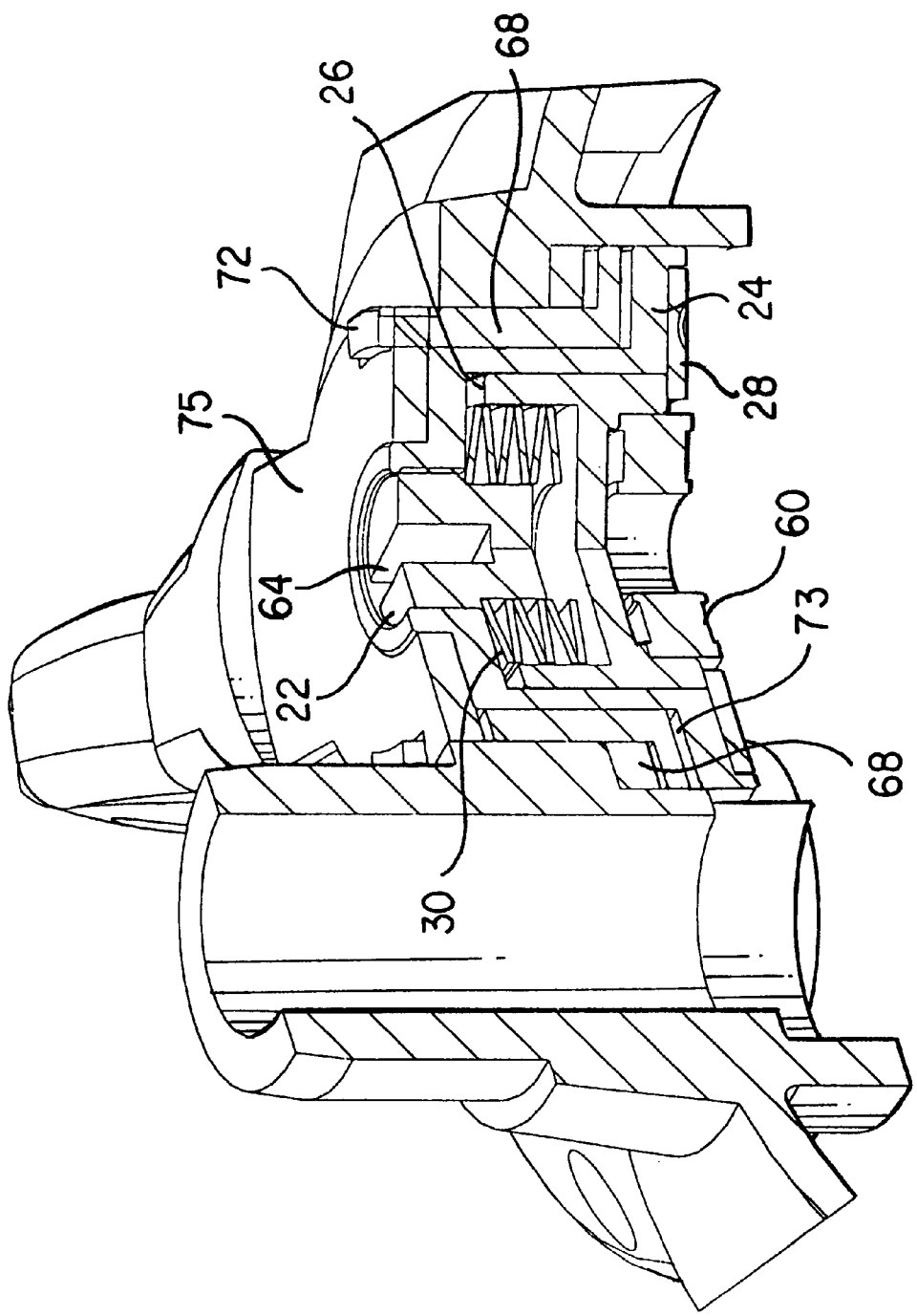
FIG. 1 is a perspective view partially broken away of a portion of a reel having a cartridge-type preset mechanism in accordance with my invention.
Figure 2:
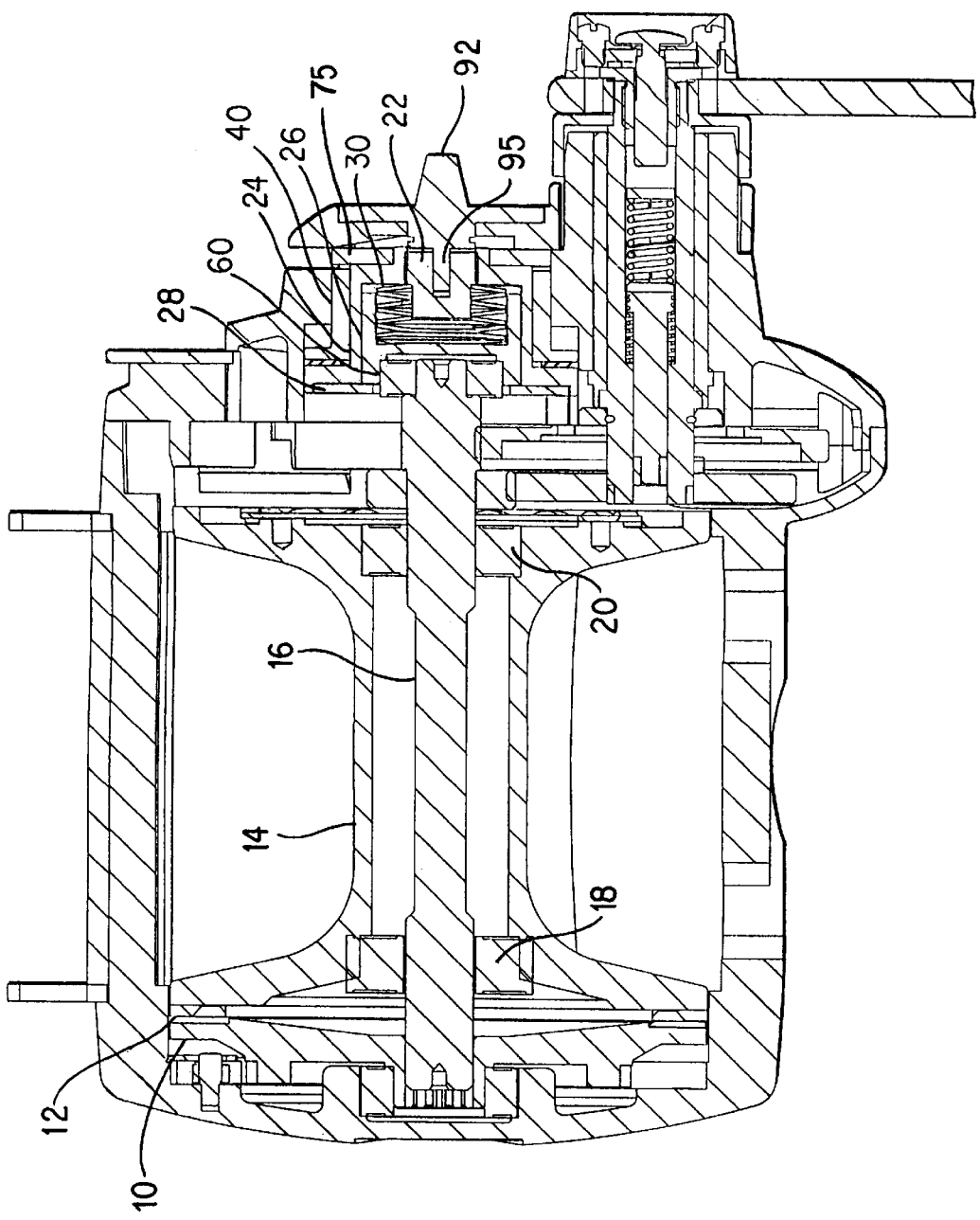
FIG. 2 is a cross-section of a side elevation of a reel having my mechanism.
Figure 4:
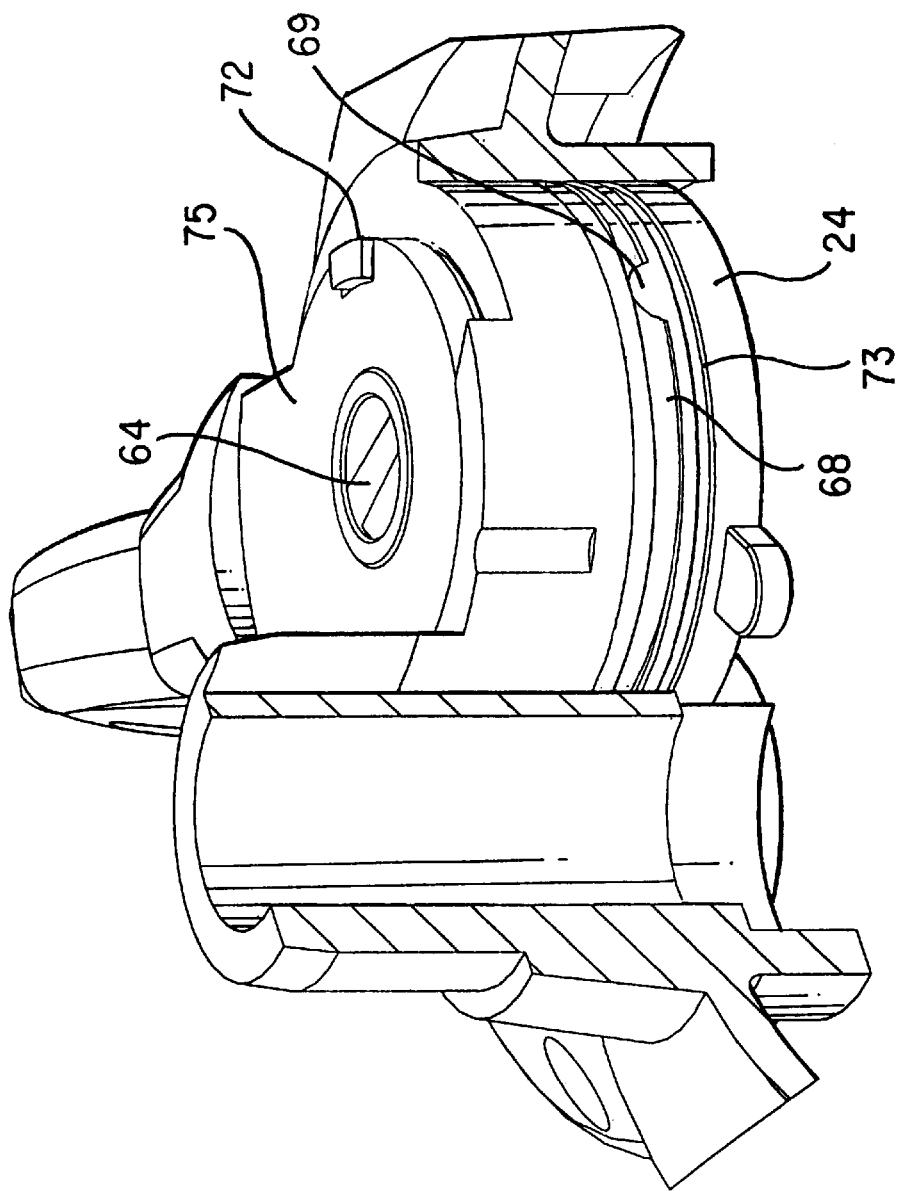
FIG. 4 is another perspective view partially broken away of a device in accordance with my invention.

Referring to the Figures, FIG. 2 shows a cross-section of a fishing reel with a friction drag means which, in general configuration and many component parts, is known in the prior art. See, for example, FIG. 2 of the F. S. Griste Pat. No. 3,425,644. However, in this device, I have replaced the preset drag mechanism shown in the Griste Patent with a cartridge-type preset drag mechanism. Both in the prior art and this application, there is a drag washer shown in FIG. 2 at 10 mounted on the left with a space of approximately 0.030 inch between the drag washer 10 and the drag plate 12 (which is fixedly attached to the left end of the spool 14). The spool is mounted on a main shaft 16 supported by bearings 18 and 20. The whole spool and shaft mechanism can be moved to the left to close the gap between the drag washer and drag plate in order to impose a resistance to the turning of the spool, and thus the playing out of the line from the spool.

In the condition shown in FIG. 2, the drag mechanism is in the free spool condition, that is, there is no drag imposed between the drag washer and drag plate. This condition can be changed by rotating or "throwing" the drag lever (such as that shown in the prior art FIG. 2 at 75). As shown in FIG. 3 thereof, the drag lever engages lugs 72 on the end plate of the cam 68. As the cam rotates about the shaft, the pins 65 ride out of the notches 69 and continue to ride on the cam surfaces 70, thus forcing the bearing carrier 61 axially to the left. As the bearing carrier moves, it moves the bearing positioning head 63 and bearing 60 and moves them to the left, thus causing the entire mechanism to move to the left and impose the drag.

In addition, the adjusting knob 92 (which has a tab 95 positioned in the slot 64 of the bearing positioning head 63), can be rotated so that the bearing positioning head 63 pushes upon the bearing 60 and moves it to the left as aforesaid. This is accomplished because the bearing positioning head is in threaded engagement with one end of the bearing carrier 61 and thus as the bearining positioning head is rotated, the bearing carrier will translate axially. By so doing, the drag can be preset. However, in this prior art device, you cannot pre-load the Belleville springs 40 FIG. 2 that are positioned ahead of the bearing 34. Furthermore, there are no springs ahead of the bearing 60, FIG. 2.

In my invention, the drag knob tab 95 engages a preset screw 22 in a cartridge 24.

Figure 5:
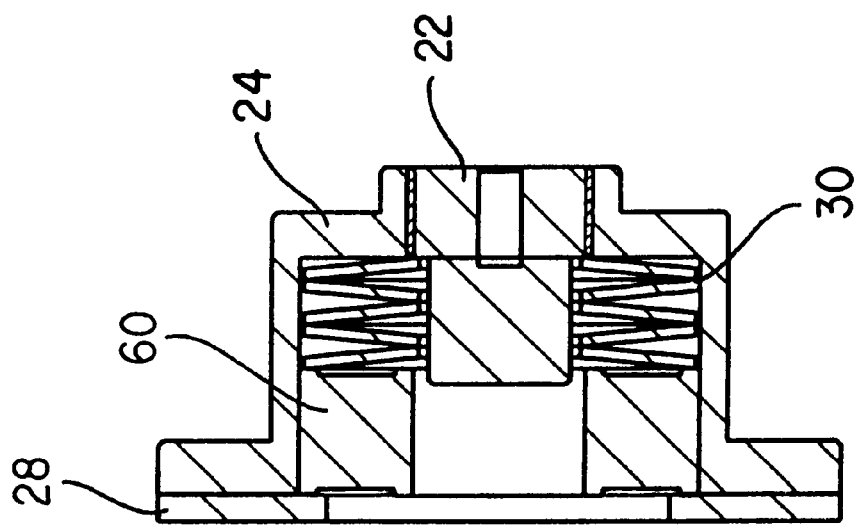
FIG. 5 is a view in section of the preferred embodiment of my invention.

In the preferred embodiment, it is not necessary to have the bearing/spring cup 26 as described more fully herein after. Rather, that cup can be dispensed with and the bearing 60 FIG. 5 can be mounted within the cartridge 24. The retaining ring 28 extends radially inwardly beyond the opening in the cartridge 24 to retain the bearing 60 within the cartridge 24. The Belleville springs 30 impinge directly upon the bearing surface as shown.

In an alternate embodiment, within the cartridge 24, I provide a cylindrical bearing/spring retaining cup 26. It is retained within the cartridge 24 by a retaining ring 28 which is fixedly attached to cartridge 24 and extends beyond the opening in the cartridge to interfere with the bearing/spring cup 26 and extends radially inwardly as aforesaid to prevent the cup 26 from exiting from the cartridge (as shown in FIG. 2). The left end of the bearing/spring cup comprises a holder for retaining the outer race of the bearing 60. The inner shoulder of the bearing/spring cup impinges upon the radial surface of the bearing 60 (as clearly shown) such that when the bearing/spring cup moves to the left, it will move the bearing. This is an optional arrangement.

The other axial portion of the bearing/spring cup 26 comprises a cylindrical well in which washers or Belleville springs 30 are positioned. The right most one of these springs impinges upon a shoulder on the preset screw 22. Since the preset screw 22 is axially threaded in the cartridge 24, rotation of the drag knob 92 will cause axial movement of the preset screw 22. If that movement is to the left, when viewed as in FIG. 2, the Belleville springs 30 will be partially collapsed.

Thus, it will be seen that no matter how much the preset screw is turned and force is applied to the Belleville springs, free spool cannot be lost when the device is in the free spool position.

By placing the springs in a separate housing which retains the springs, the springs are directly preloaded by the preset screw 22. Whereas, in a prior art lever drag preset reel adjustment in drag range is made by varying the initial clearances between the drag members. This is shown in the Griste '644 Patent wherein that initial clearance can be varied by turning the preset knob and thereby advancing the bearing from right to left. My design does not change this initial clearance, as it does not advance the bearing to close the drag gap. Rather, in operation as the preset screw is tightened, it squeezes the Belleville springs, but does not move the bearing 60. When the drag lever is thrown the cam follower moves towards the left. The cartridge and the bearing 60 also move to the left; until the gap between the drag plates is closed. At this point, the bearing and bearing cup stop axial movement. The cartridge housing 24 and preset screw 22 may continue to move axially. The bearing cup 26 is free to move within the cartridge housing 24. This may cause the Belleville springs to be even further compressed, thus increasing the drag force.

The cartridge is keyed to the right side plate to prevent rotation in the event that the bearing freezes-up.

One will always lose free spool by moving the drag lever, but not by turning the preset knob. Thus, one can set drag at strike to a certain amount, and then tighten the preset knob to increase it. In that event, the force of the shaft and bearings is against the Belleville springs and would affect the position of bearing 60 within the cartridge.

There are several benefits to this. First, clearance between the drag washer and drag plate can be minimized, thus minimizing spool movement.

Second, main shaft movement is also minimized, thus allowing for thinner gears; which are lighter and cheaper to make.

Third, the "click" operation is more consistent. This is due to less spool movement, i.e., the distance from the click plate and the click pin changes less.

What is claimed is:

1. In a fishing reel having a friction drag mechanism comprising at least two members which when disengaged provides a space between the at least two members to provide a free spool condition and when engaged provide a drag condition; and a spring loaded preset drag mechanism having a spring, the improvement comprising: means to preset the force of the spring loading for the drag condition while maintaining the space between the at least two members in the free spool condition.

2. The fishing reel of claim 1 wherein said means comprises: a shaft journaled in a bearing so as to move axially therewith; restraining means to restrain said bearing from axial movement, in a first condition; force application means to apply a force against said bearing while in the first condition and to cause it to move axially and move said shaft, in a second condition; and force variation means to vary the amount of force applied by the force application means, in said first condition without causing said bearing to move to said second condition.

3. The fishing reel of claim 2 wherein: said bearing is restrained from axial movement within a retainer means and said spring impinges on said bearing to impart axial force thereto within said restraining means; said spring being acted upon by said force variation means.

4. A preset cartridge drag mechanism system for a fishing reel, wherein a drag knob moves springs within a separate cartridge located in said reel; the cartridge is acted upon by a drag lever; the springs in the cartridge preset system are compressed within the cartridge; these springs act directly upon a bearing retained in the cartridge; thus allowing a preset screw to compress the springs, while not altering the free spool condition of the drag mechanism.

* * * * *